(12) United States Patent
Cohen et al.

(10) Patent No.: US 8,504,585 B2
(45) Date of Patent: Aug. 6, 2013

(54) MATCHING A USER TO A CONVERSATION

(75) Inventors: Ira Cohen, Modiin (IL); Michal Aharon, Haifa (IL); Eli Mordechai, Modiin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 105 days.

(21) Appl. No.: 13/149,869

(22) Filed: May 31, 2011

(65) Prior Publication Data

US 2012/0310949 A1    Dec. 6, 2012

(51) Int. Cl.
*G06F 17/30*    (2006.01)

(52) U.S. Cl.
USPC ........................................................ 707/771

(58) Field of Classification Search
USPC .................. 707/748–758, 765–772
See application file for complete search history.

(56) References Cited

U.S. PATENT DOCUMENTS

| | | | |
|---|---|---|---|
| 7,613,664 B2 | 11/2009 | Riezler et al. | |
| 2003/0028525 A1 | 2/2003 | Santos et al. | |
| 2009/0106697 A1* | 4/2009 | Ward et al. | 715/835 |
| 2009/0234796 A1 | 9/2009 | Cropper et al. | |
| 2010/0205541 A1* | 8/2010 | Rapaport et al. | 715/753 |

FOREIGN PATENT DOCUMENTS

CN          101599071 A    12/2009

OTHER PUBLICATIONS

A. C. Surendran, J. C. Platt & E. Renshaw, Automatic Discovery of Personal Topics to Organize Email, Research Paper, Mircrosoft Research, Redmond, WA, Jul. 2005, 6 pages.
C. Abela & K. Cortis, SemChat: Extracting Personal Information From Chat Conversations, Research Paper, Dept. of Intelligent Computer Systems, University of Malta, Oct. 2010, 10 pages.

* cited by examiner

*Primary Examiner* — Wilson Lee
(74) *Attorney, Agent, or Firm* — Jack H. McKinney

(57) ABSTRACT

A method for matching a user to a conversation includes, for each of a plurality of documents, mapping the document to one or more of a plurality of topics. The document is associated with a user. For each user, the user is mapped to each of the plurality of topics that are mapped to documents with which the user is associated. One of the users is matched to a conversation according to the mappings of the users to those of the plurality of topics that are also mapped to the conversation.

20 Claims, 5 Drawing Sheets

US 8,504,585 B2

MATCHING A USER TO A CONVERSATION

BACKGROUND

Conversations are posted or added to online forums for many purposes. One may have a question and post a conversation seeking an answer to that question. Another may seek an opinion on a subject and post a conversation related to that subject. Once a conversation is posted, one waits for a response with the expectation that another will reply with valuable insight into the topic of the conversation.

DRAWINGS

DETAILED DESCRIPTION

Introduction:

Various embodiments described below were developed in an effort to match a conversation to a relevant user. The term conversation, as used herein, refers to a body of text conveyed in one of many possible forms. Example forms include, e-mail message, chats, forum threads, and other electronic submissions. A user as used herein refers to an individual. A relevant user is an individual having been identified as having expertise with respect to a topic of the conversation.

To identify a relevant user, each of a plurality of documents is mapped to one or more of a plurality of topics. Each document is associated with a user. Each user is mapped to the plurality of topics that are mapped to documents with which the user is associated. A user can then be matched to a conversation according to the mappings of the users to a topic that is also mapped to the conversation. For example, a given user may be associated with a number of documents that are mapped to the topic of the conversation. This user may be identified as relevant and matched to the conversation. Such matching can include recommending the user and communicating the conversation to the user.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
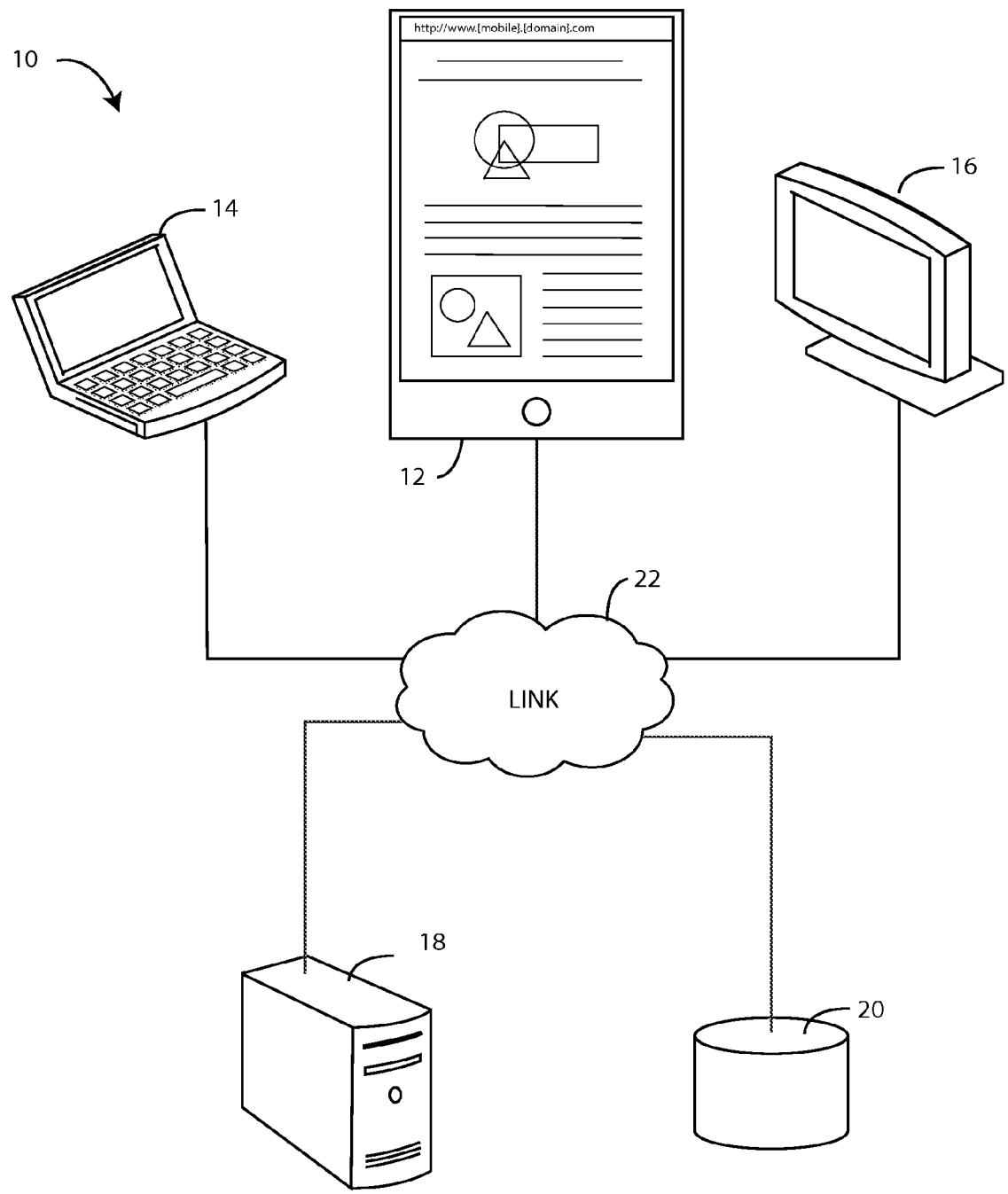
FIG. 1 depicts an environment in which various embodiments may be implemented.

Environment:

FIG. 1 depicts an environment 10 in which various embodiments may be implemented. Environment 10 is shown to include user devices 12, 14, and 16, server device 18, and data store 20. Components 12-18 are interconnected via link 22. User devices 12, 14, and 16 each represent generally any computing device capable of electronic communication with server device 18 via link 22. In particular, user devices 12-16 may be used to communicate or update a conversation to server device 18. Client devices 12, 14, and 16 may also be used to communicate documents relevant to topics of the conversations. Where, for example, conversations take the form of forum threads, such documents may be comments addressing questions in the threads. Where the conversations take the form of electronic submissions needing reviews, the documents may take the form of such reviews. In general, however, a document is a body of electronic text that can be identified as being relevant to a topic of a conversation and that can be linked to a particular user who authored it.

Server device 18 represents generally any computing device that can be configured to match a conversation to a relevant user. Examples of such configurations are discussed below. In particular, server device 18 operates to identify user's who authored documents relevant to the topic of a conversation and to then match that conversation to such users. Data store 20 represents generally a device configured to store data used by server device 18 in performance of its tasks. Such data can include conversations, documents, and data mapping conversations to users authoring documents relevant to topics found in those conversations.

Link 22 represents generally one or more of a cable, wireless, fiber optic, or remote connections via a telecommunication link, an infrared link, a radio frequency link, or any other connectors or systems that provide electronic communication between components 12-20. Link 22 may include, at least in part, an intranet, the Internet, or a combination of both. Link 22 may also include intermediate proxies, routers, switches, load balancers, and the like.

It is noted that while FIG. 1, depicts environment 10 as including three client devices 12-16, one server device 18, and one data store 20, environment 10 may include any number of such components 12-20. For example, the functions of server device 18 described above and later may be performed using multiple server devices. Data store 20 may be implemented using one or more database servers or may be implemented using memory integrated in server device 18. Further, the functions of server device 18 and data store 20 may be performed; at least in part, by a given client device 12, 14, or 16.

Figure 2:
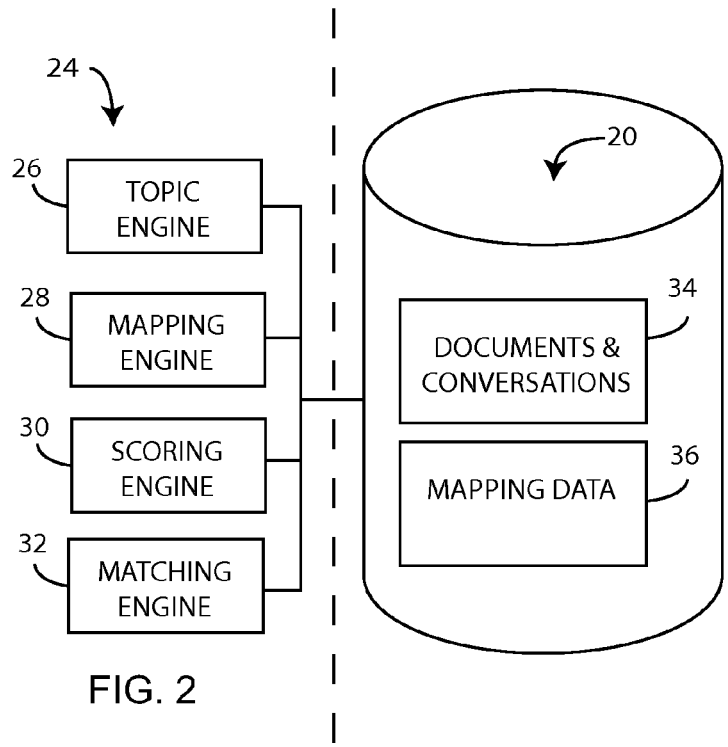
FIG. 2 depicts a system according to an embodiment.

Components:

FIGS. 2-6 depict examples of physical and logical components for implementing various embodiments. FIG. 2 depicts system 24 for matching a user to a conversation. As shown, system 24 includes topic engine 26, mapping engine 28, scoring engine 30, and matching engine 32. Topic engine 26 represents generally any combination of hardware and programming configured to discern topics in conversations and documents. The term topic is used to refer to a subject matter area. Thus, for a given conversation or document, topic engine may discern one or more topics. In one example, topic engine may implement the PARIS algorithm to discern topics. The PARIS algorithm is discussed in a publication authored by Michal Aharon, Ira Cohen, Arik Itskovitch, Inbal Marhaim and Ron Banner and presented as part of the 2010 IEEE International Conference on Data Mining Workshops. See Michal Aharon, et al, "The PARIS Algorithm for Determining Latent Topics" in International Conference on Data Mining Workshops, 2010© IEEE DOI 10.1109/ICDMW.2010.187.

Mapping engine 28 represents generally any combination of hardware and software configured to map conversations to topics discerned by topic engine 26. Mapping engine 28 is responsible, for each of a plurality of documents, for mapping the document to one or more of a plurality of topics as discerned by topic engine 26. Each such document is associated with a user. In one example, an associated user is an author of the document. For each such user, mapping engine 26 is responsible for mapping that user to each of the plurality of topics that are mapped to documents with which the user is associated. Examples of such mappings are discussed in more detail below with respect to FIGS. 3 and 4.

Scoring engine 30 represents generally any combination of hardware and programming configured to assign a score to each mapping between a user and a topic. Each such score provides objective evidence of a user's expertise with respect to a given topic. Examples of how a score may be calculated are discussed below with respect to FIGS. 3 and 4. In general a user's score on a particular topic is related to the mapping or mappings of that user to documents that are mapped to the topic.

Matching engine 32 represents generally any combination of hardware and programming configured to match one of the users to a conversation according to the mappings of the users to a topic that is also mapped to the conversation. Matching engine 32 may do so based on scores assigned by scoring engine 30. Matching can include recommending that the corresponding user or users be associated with the conversation. For example, where a conversation is a submission needing a reviewer or a forum post with a question, matching may include recommending the corresponding user or users as reviewers or as individuals who may be able to answer the posted question. Matching can also include communicating the conversation or information relevant to the conversation to the corresponding user or users.

FIG. 2 also depicts data store 20 as including documents and conversations 34 and mapping data 36. Mapping data 36 represents generally data used for mapping users to topics as well as data representing such the mappings and associated scores. Mapping data 36 is discussed in more detail below with respect to FIG. 3.

Figure 3:
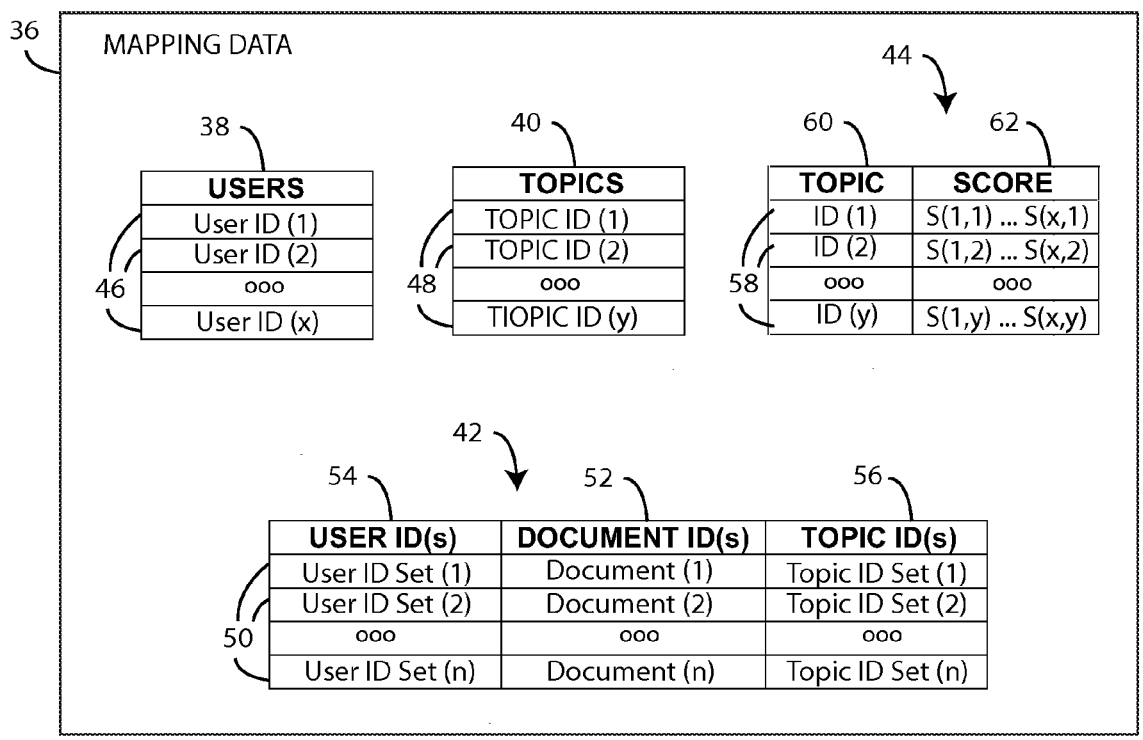
FIG. 3 depicts mapping data according to an embodiment.

Moving to FIG. 3, mapping data 36 is shown to include user table 38, topic table 40, mapping table 42, and score table 44. User table 38 identifies users 46 associated with a collection of documents. Such users may be authors of those documents. Topic table 40 identifies topics 48 identified in the documents. In the example of FIG. 3, there are "x" number of users and "y" number of topics. Referring to FIG. 2, topic engine is responsible for maintaining tables 38 and 40.

Mapping table 42 represents data mapping users identified in table 38 to topics identified in table 40. Referring to FIG. 2, mapping engine 28 is responsible for maintaining table 42. As depicted, mapping table 42 includes a series of entries 50 each containing data in document field 52, user ID field 54, and topic field 56. In particular data in document field 52 of a given entry 50 identifies a particular document. Data in user field 54 of an entry 50 identifies a user or users associated with a corresponding document. Data in topic field ID 56 if a given entry identifies one or more topics identified in the document identified in field 52 of that same entry 50. Thus, mapping table 42 maps each of a plurality of documents to the topics identified in that document. Mapping table 42 also maps each user to the topics that are mapped to the documents with which that user is associated.

Score table 44 represents data assigning a score to each mapping of a user to topic. Referring to FIG. 2, scoring engine 30 is responsible for maintaining table 56. Score table 44 includes a number of entries 58. Each entry 58 includes data in topic field 60 and score field 62. Data in topic field 60 identifies a given topic, while data in score field 62 identifies the scores assigned to the mapping of each user with respect to that identified topic. In the example of FIG. 3, S(1,1) represents the score assigned to the mapping of user (1) of table 38 to topic (1) of table 40. S(x,y) represents the score assigned to the mapping of user (x) of table 38 to topic (y) of table 40. Various techniques for calculating a given score are discussed below with respect to FIG. 4.

Figure 4:
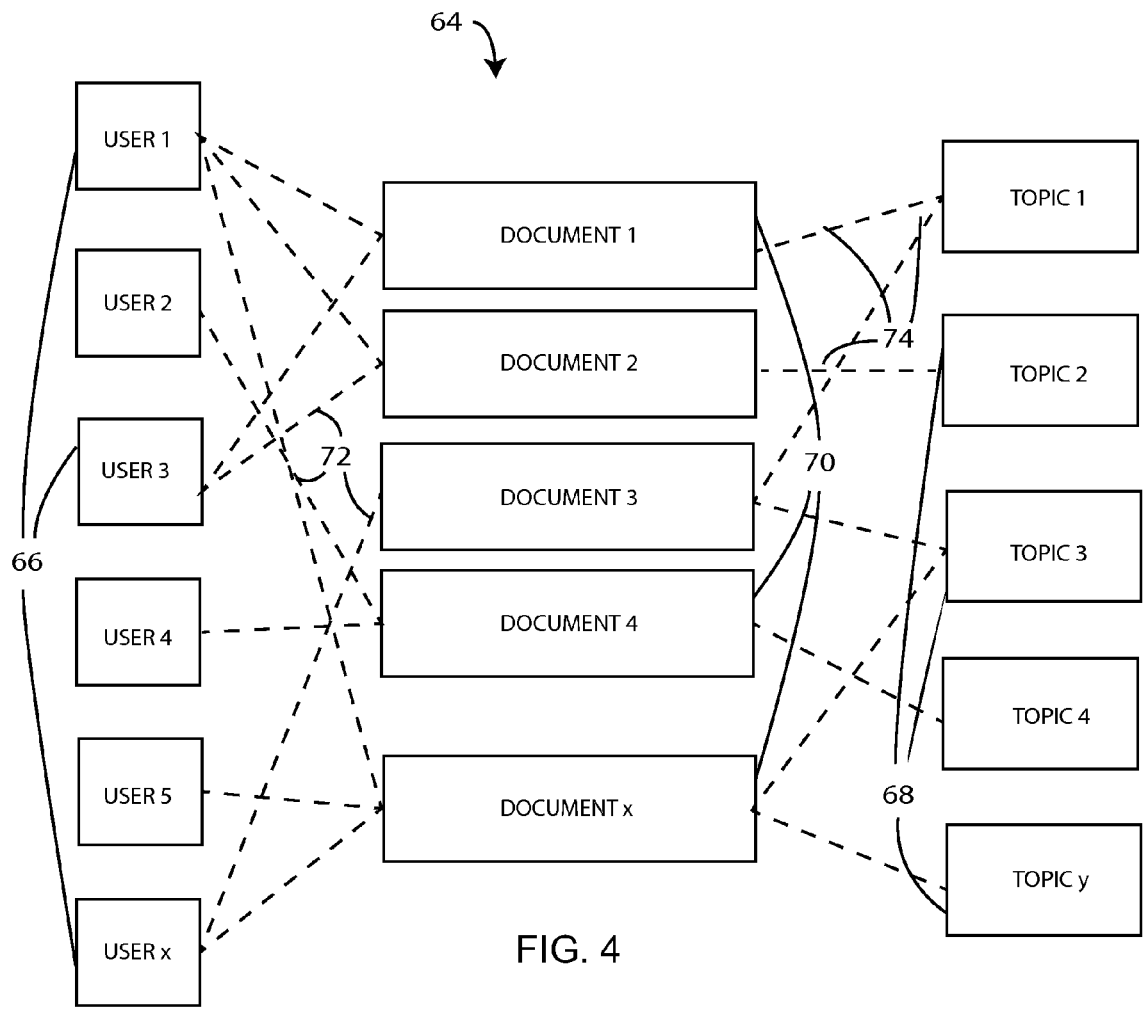
FIG. 4 depicts an example of a graph mapping users to topics according to an embodiment.

FIG. 4 depicts graph 64 representing the mappings of users 66 to topics 70 with documents 70 serving as linkages there between. In other words, in graph 64 each user 66 is linked to the documents 70 with which that user is associated, and each document 70 is linked to the topics with which that document 70 is associated. Referring to FIG. 2, mapping engine 28 in performance of its tasks may build an electronic representation of graph 64 using mapping data 36. Scoring engine 30 can then utilize graph 64 to assign scores. With respect to graph 64, links 72 exist between each user 66 and the documents 70 with which each user 66 is associated. Links 74 exist between each document 70 and the topic or topics 68 identified in that document.

Looking at FIG. 4, various paths between a user 66 and a topic 68 exist with documents 70 serving as linkages in those paths. Example paths include two hop paths, four hop paths, and six hop paths. Scoring engine 30 can assign a score to a mapping between a given user and a given topic based on the number of such paths between that user and that topic. A two hop path is a path that passes from a given user 66 via a link 72 through a document 70 via a link 74 to a given topic 74. The existence of a two hop path indicates that a user is associated a document identified as being directly relevant to the particular topic. In the example of FIG. 4, a two hop path exists between user(1) and topic(1), but not between user(1) and topic(2).

A four hop path is a path that passes from the given user 66 via a link 72 through a document 70 via a link 74 to a different topic, back to a different document via another link 74 and then to the given topic 68 via yet another link 74. A four hop path indicates that a given user is at least indirectly associated with a given topic. In particular, the given user is directly associated with another topic, as evidenced by a two hop path between that user and a document, and that other topic is linked to a document that is also linked to the given topic. In the example of FIG. 4, a four hop path exists between user (1) and topic (3) where user (1) is directly associated with topic (1) via document (1). Topic (1) is linked to document (3) which in turn is linked to topic (3). Thus, user (1) is indirectly associated with topic (3). Should user (1) become associated with a document linked to topic (3), user (1) would also be directly associated with topic (3).

A six hop path is a path that passes from the given user 66 via a link 72 through a document 70 via a link 74 to a different topic 68. That path continues back to a different document 70 via another link 74 and back to a similar user 66. The path continues from that other user via a link 72 through a document 70 and on to the given topic 68 via a link 74. A user can be identified as similar to the given user when two hop paths exist between a sufficient number of topics and both users. In the example of FIG. 4, a six hop path exists between user (1) and topic (y) if user (x) is similar to user (1). In the Example of FIG. 4, two, two hop paths exist between users (1) and topics (1) and (2). Two, two hop paths also exist between user (x) and the same two topics. Where two is a quantity determined to be a sufficient, user (1) and user (x) may be deemed to be similar, and a six hop path would exist between user (1) and topic (y).

As noted above, scoring engine 30 can use graph 64 to calculate scores to assign mappings between users 66 and topic 68. Scoring engine 30 may do so by identifying the number of two, four, and six hop paths between a given user and a given topic. The following equation may be used: score A+F1(B)+F2(C). A represents the number of two hop paths, B represents the number of four hop paths, and C represents the number of six hop paths. F1 is a function that discounts the number of four hop paths so that each four hop path has less influence on the score than a two hop path. Likewise F2 is a function that discounts the number of six hop paths so that each six hop path has less influence on the score than a two hop path. The particulars of F1 and F2 will determine whether a given four hop path will have a greater influence than a given six hop path would have the greater influence.

As noted, documents 70 serve as linkages between a given user and a given topic in a mapping of that user to that topic. The age of those documents serving as linkages in a mapping may also affect the calculation of a score assigned to that mapping. As the age of a documents increases, the relevance of the document may be deemed to decrease with respect to the given topic. Thus, the score assigned to a mapping of a given user to a give topic may be discounted based on the age of each document that serves as a linkage in the mapping. A discounting factor w(t) for a given document may be calculated as:

$$w(t)=C*\exp(-(t-Tc))$$

where t represents the current date, Tc represents the last change date for the document and C represents some normalizing constant. Tc may be a creation date or a modification date. Using the equation for calculating a score above. The values A, B, and C will be discounted according to the ages of the documents present in the corresponding two, four, and six hop paths. It is noted that the score for a mapping can vary with time and a user's score with respect to a topic can be evaluated over time.

Figure 5:
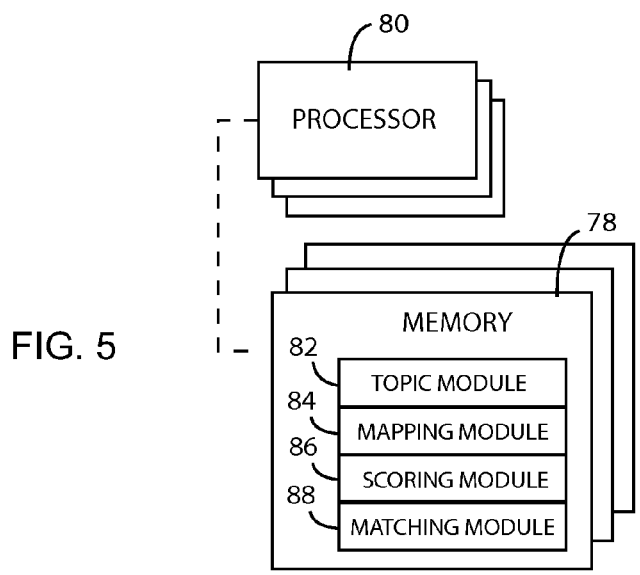
FIG. 5 is a block diagram depicting a memory and a processor according to an embodiment.

In foregoing discussion, various components were described as combinations of hardware and programming. Such components may be implemented in a number of fashions. Looking at FIG. 5, the programming may be processor executable instructions stored on tangible memory media 78 and the hardware may include a processor 80 for executing those instructions. Memory 78 can be said to store program instructions that when executed by processor 80 implement system 24 of FIG. 2. Memory 78 may be integrated in the same device as processor 80 or it may be separate but accessible to that device and processor 80. In the example of FIG. 5, memory is shown to include topic module 82, mapping module 84, scoring module 86, and matching module 88. Each module 82-88 represents program instructions that, when executed, implement a corresponding engine 26-32 of FIG. 2. For example, the execution of module 82 by processor 80 implements topic engine 26.

In one example, the program instructions 82-88 can be part of an installation package that can be executed by processor 80 to implement system 24. In this case, memory 78 may be a portable medium such as a CD, DVD, or flash drive or a memory maintained by a server from which the installation package can be downloaded and installed. In another example, the program instructions may be part of an application or applications already installed. Here, memory 78 can include integrated memory such as a hard drive, a solid state drive, RAM, or ROM.

Figure 6:
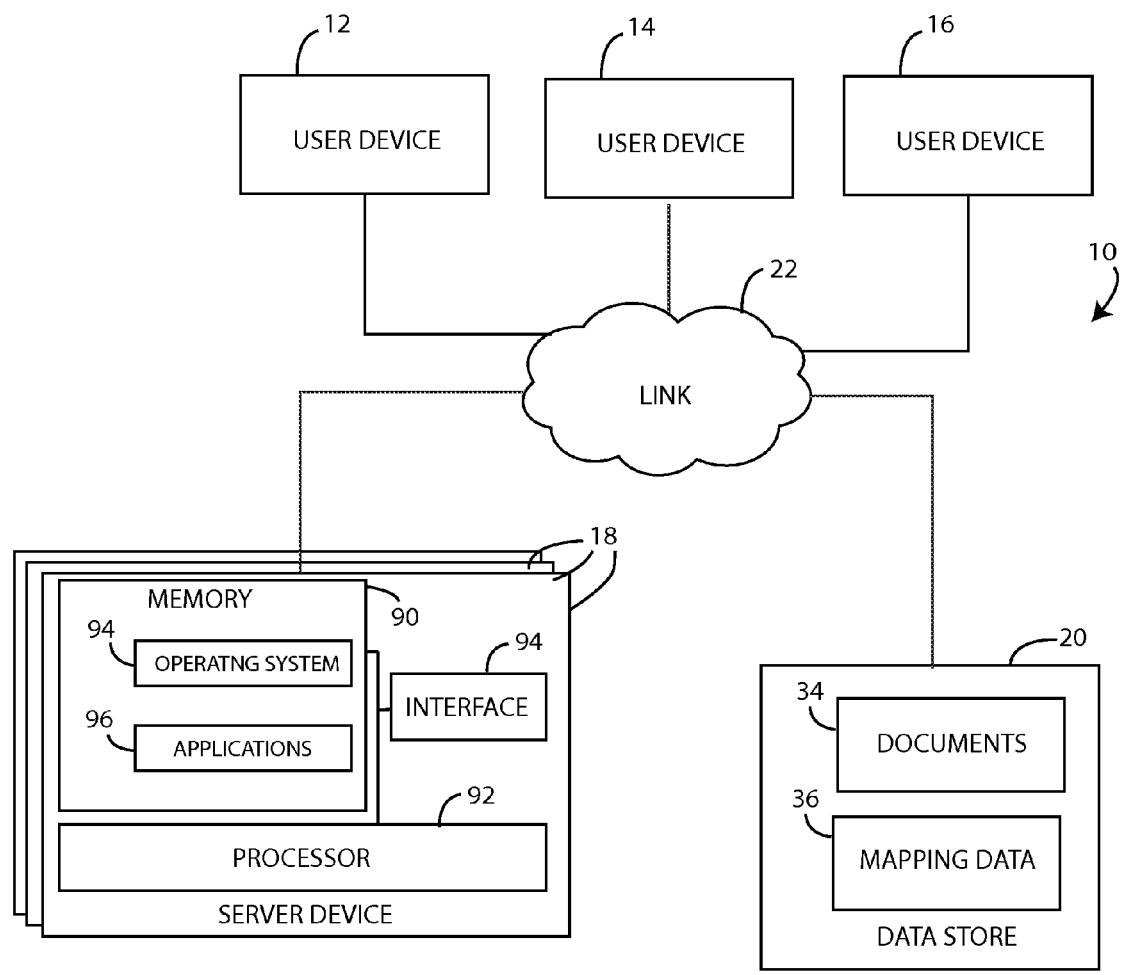
FIG. 6 is a block diagram depicting the physical and logical elements of a server device implementing the system of FIG. 2 according to an embodiment.

As a further example, FIG. 6 depicts a block diagram illustrating elements server device 18. As noted with respect to FIG. 1, server device 18 may include a plurality of server devices and the various elements described below may be distributed on whole or in part across that plurality. Server device 18 is shown to include memory 82, processor 84, and interface 86. Processor 84 represents generally any processor configured to execute program instructions stored in memory 82 to perform various specified functions. Interface 86 represents generally any wired or wireless interface enabling that server device 18 to communicate via link 22. Memory 82 is shown to include operating system 94 and applications 96. Operating system 94 represents a collection of programs that when executed by processor 92 serve as a platform on which applications 96 can run. Examples of operating systems include, but are not limited, server versions of Microsoft's Windows® and Linux®. Applications 96 represent program instructions for various functions of a given server device 18.

Looking at FIG. 2, engines 32-38 are described a combinations of hardware and programming. The hardware portions may, depending on the embodiment, be implemented as processor 94. The programming portions, depending on the embodiment can be implemented by operating system 94, applications 96, or combinations thereof.

Figure 7:
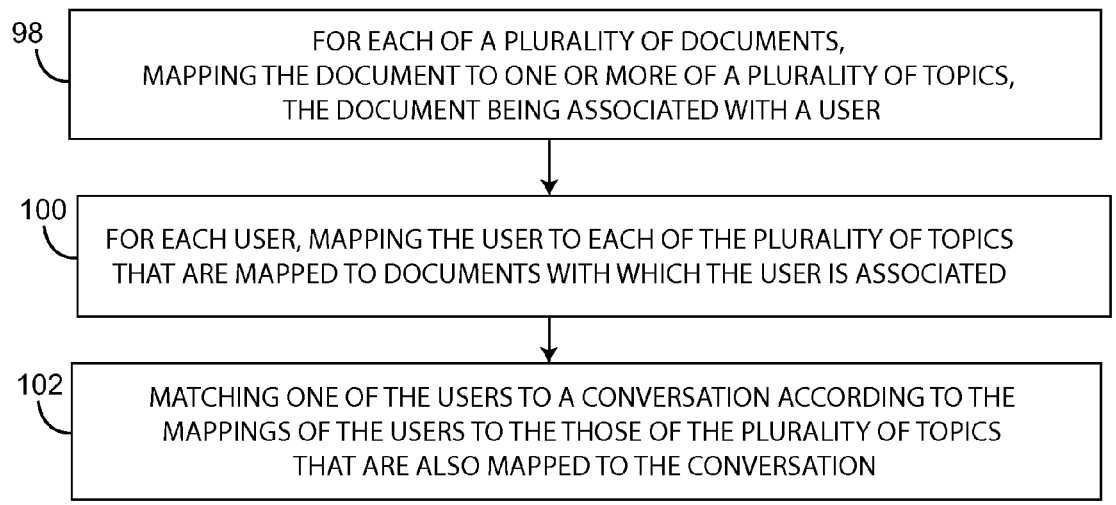
FIG. 7 is a flow diagram depicting steps taken to implement an embodiment.

Operation:

FIG. 7 is an exemplary flow diagram of steps taken to implement an embodiment in which a user may be matched to a conversation. In discussing FIG. 7, reference may be made to the diagrams of FIGS. 1-6 to provide contextual examples. Implementation, however, is not limited to those examples. For each of a plurality of documents, each document is mapped to one or more of a plurality of topics (step 98). Each such document is associated with one or more of a plurality of users. For each user, that user is mapped to each of the plurality of topics that are mapped to documents with which that user is associated (step 100). Referring to FIG. 2, mapping engine 28 may be responsible for steps 98 and 100. Steps 98 and 100 may, for example, include the maintenance of mapping table 42 (FIG. 3) and the building of graph 64 (FIG. 4).

Continuing with FIG. 7, one of the users is matched to a conversation according to the mappings of the users to the those of the plurality of topics that are also mapped to the conversation (step 102). Referring to FIG. 2, matching engine 32 may be responsible for steps 102. Step 102 may, for example, include the maintenance of mapping table 42 (FIG. 3) and the building of graph 64 (FIG. 4). The method depicted in FIG. 7 may also include assigning a score to each mapping between a user and a topic and step 102 may include matching one of the users with the conversation according to the scores. Step 102 may include, for each of a selected number of top scores, recommending the corresponding users be associated with the conversation or communicating the conversation or information relevant to the conversation to the corresponding users.

As noted, steps 96 and 98 may include building a graph such as graph 64 of FIG. 4 that in which each user is linked to the documents with which the user is associated and each document is linked to the topics with which it is mapped. Assigning a score to a mapping between a user and a topic can include assigning a score whose value depends on the number of linkages between the user and the topic in the graph. As discussed earlier, an assigned score may be a function of the number of two, four, and six hop paths between the user and the topic in the graph. Further, the value of a given score may be discounted according to an age of each document serving as one of the number of linkages in the mapping of the corresponding user to the corresponding topic.

CONCLUSION

FIGS. 1-6 aid in depicting the architecture, functionality, and operation of various embodiments. In particular, FIGS. 2-6 depict various physical and logical components. Various components illustrated in FIGS. 2 and 6 are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 7 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for matching a user to a conversation comprising:
   for each of a plurality of documents, mapping the document to one or more of a plurality of topics, the document being associated with a user;
   for each user, mapping the user to each of the plurality of topics that are mapped to documents with which the user is associated;
   assigning a score to each mapping between a user and a topic based on a linked association among the user, the document, and the topic to identify a relevant user; and
   matching one of the users to a conversation according to the mappings of the users to those of the plurality of topics that are also mapped to the conversation based on the score.

2. The method of claim 1, comprising discovering the topics in the plurality of documents and wherein mapping the document comprises mapping the document to the topics identified in that document.

3. The method of claim 1, wherein the document used to assign a score is authored solely by the user.

4. The method of claim 1, wherein matching comprises, for each of a selected number of the top scores performing one of:
   recommending the corresponding users be associated with the conversation; and
   communicating the conversation or information relevant to the conversation to the corresponding users.

5. The method of claim 1, wherein:
   mapping each user to each of the plurality of topics comprises building a graph in which each user is linked to the documents with which the user is associated and each document is linked to the topics with which it is mapped such that each document serves as a linkage between a user and a topic in the graph; and
   assigning a score to each mapping between a user and a topic comprises assigning a score whose value depends on the number of linkages between the user and the topic in the graph.

6. The method of claim 5, wherein assigning a score comprises assigning a score that is a function of one of:
   a number of two hop paths between the user and the topic, each two hop path passing through links in the graph from the user through one of the documents to the topic;
   a number of four hop paths between the user and the topic, each four hop path passing through links in the graph from the user through one of the documents to another one of the topics back to another one of the documents and then to the topic; and
   a number of six hop paths between the user and the topic, each six hop path passing through links in the graph from the user to one of the documents to another one of the topics back to another one of the documents and back to another user identified as being similar to the user, on to another one of the documents and then on to the topic.

7. The method of claim 5 wherein assigning a score comprises assigning a score whose value depends on the number of linkages between the user and the topic in the graph and is discounted according to an age of each document serving as one of the number of linkages.

8. A non-transitory computer readable medium storing computer executable instructions in the form of a mapping module, a scoring module, and a matching module, wherein:
   the mapping module when executed operates to:
      for each of a plurality of documents, map the document to one or more of a plurality of topics, the document being associated with a user; and
      for each user, map the user to each of the plurality of topics that are mapped to documents with which the user is associated;
   the scoring module, when executed operates to assign a score to each mapping between a user and topic based on a linked association among the user, the document, and the topic to identify a relevant user; and
   the matching module, when executed operates to match one of the users to a conversation according to the mappings of the users to a topic that is also mapped to the conversation based on the score.

9. The medium of claim 8, wherein the medium stores computer executable instructions in the form of a topic module configured, when executed, to discover the topics in the plurality of documents and the conversation.

10. The medium of claim 8, wherein the document used to assign a score is authored solely by the user.

11. The medium of claim 8, wherein the matching module, when executed, operates to match by one of:
   recommending, for each of a selected number of the top scores, that the corresponding users be associated with the conversation; and
   communicating, for each of a selected number of the top scores, the conversation or information relevant to the conversation to the corresponding users.

12. The medium of claim 8, wherein:
   the mapping module, when executed operates to map each user to each of the plurality of topics by building a graph in which each user is linked to the documents with which the user is associated and each document is linked to the topics with which it is mapped such that each document serves as a linkage between a user and a topic in the graph; and the scoring module, when executed, operates to assign a score whose value depends on the number of linkages between the user and the topic in the graph.

13. The medium of claim 12, wherein the scoring module, when executed, operates to assign a score that is a function of one of:

a number of two hop paths between the user and the topic, each two hop path passing through links in the graph from the user through one of the documents to the topic;

a number of four hop paths between the user and the topic, each four hop path passing through links in the graph from the user through one of the documents to another one of the topics back to another one of the documents and then to the topic; and a number of six hop paths between the user and the topic, each six hop path passing through links in the graph from the user to one of the documents to another one of the topics back to another one of the documents and back to another user identified as being similar to the user, on to another one of the documents and then on to the topic.

14. The medium of claim 12, wherein the scoring module, when executed, operates to assign a score whose value depends on the number of linkages between the user and the topic in the graph and is discounted according to an age of each document serving as one of the number of linkages.

15. A system to match a user to a conversation, comprising a mapping engine, a scoring engine, and a matching engine, wherein:

the mapping engine comprises a non-transitory machine-readable medium storing instructions executed by a processor to:

for each of a plurality of documents, map the document to one or more of a plurality of topics, the document being associated with a user; and for each user, map the user to each of the plurality of topics that are mapped to documents with which the user is associated;

the scoring engine comprises a non-transitory machine-readable medium storing instructions executed by a processor to assign a score to each mapping between a user and a topic based on a linked association among the user, the document, and the topic to identify a relevant user; and the matching engine comprises a non-transitory machine-readable medium storing instructions executed by a processor to match one of the users to a conversation according to the mappings of the users to a topic that is also mapped to the conversation based on the score.

16. The system of claim 15, wherein the document used to assign a score is authored solely by the user.

17. The system of claim 15, wherein the matching engine operates to match by one of:

recommending, for each of a selected number of the top scores, that the corresponding users be associated with the conversation; and communicating, for each of a selected number of the top scores, the conversation or information relevant to the conversation to the corresponding users.

18. The system of claim 15, wherein:

the mapping engine operates to map each user to each of the plurality of topics by building a graph in which each user is linked to the documents with which the user is associated and each document is linked to the topics with which it is mapped such that each document serves as a linkage between a user and a topic in the graph; and the scoring engine operates to assign a score whose value depends on the number of linkages between the user and the topic in the graph.

19. The system of 18, wherein the scoring engine operates to assign a score that is a function of one of:

a number of two hop paths between the user and the topic, each two hop path passing through links in the graph from the user through one of the documents to the topic;

a number of four hop paths between the user and the topic, each four hop path passing through links in the graph from the user through one of the documents to another one of the topics back to another one of the documents and then to the topic; and a number of six hop paths between the user and the topic, each six hop path passing through links in the graph from the user to one of the documents to another one of the topics back to another one of the documents and back to another user identified as being similar to the user, on to another one of the documents and then on to the topic.

20. The system of claim 18, wherein the scoring engine operates to assign a score whose value depends on the number of linkages between the user and the topic in the graph and is discounted according to an age of each document serving as one of the number of linkages.

* * * * *

UNITED STATES PATENT AND TRADEMARK OFFICE
CERTIFICATE OF CORRECTION

PATENT NO.         : 8,504,585 B2                                   Page 1 of 1
APPLICATION NO.    : 13/149869
DATED              : August 6, 2013
INVENTOR(S)        : Ira Cohen et al.

It is certified that error appears in the above-identified patent and that said Letters Patent is hereby corrected as shown below:

In the Claims:
In column 10, line 26, in Claim 19, delete "of" and insert -- of claim --, therefor.

Signed and Sealed this
Fourth Day of February, 2014

Michelle K. Lee
*Deputy Director of the United States Patent and Trademark Office*